Patented Oct. 2, 1951

2,569,677

UNITED STATES PATENT OFFICE 2,569,677

PHOTOCHEMICAL PRODUCTION OF BENZENE HEXACHLORIDE

William A. La Lande, Jr., Upper Darby, Margaretta Elizabeth Aeugle, Philadelphia, and Gladys Molyneux, Meadowbrook, Pa., assignors to The Pennsylvania Salt Manufacturing Company, Philadelphia, Pa., a corporation of Pennsylvania No Drawing. Application April 4, 1947,
Serial No. 739,359

7 Claims. (Cl. 204—163)

1

This invention relates to a new process for producing a benzene hexachloride product unusualy rich in the "gamma" isomeric form of this compound. This case is a continuation in part of our co-pending application Serial No. 695,277 filed September 6, 1946, now abandoned.

Benzene hexachloride (this term is used throughout the specification and claims to indicate any one of the isomeric forms of 1,2,3,4,5,6-hexachlorocyclohexane, as well as mixtures of the isomers of this compound) is made by addition of three molecules of chlorine to one of benzene. The resulting compound contains one chlorine atom on each carbon atom of the benzene. The benzene hexachloride product that is formed when chlorine is reacted with benzene has long been considered to be a mixture of stereoisomeric forms, the so-called "alpha," "beta," "gamma," and "delta" forms having been recognized; these are stated to be present in the approximately fixed proportion of 70% of the alpha isomer, 5% of the beta isomer, 10–12% of the gamma isomer, and 13–15% of the delta isomer.

It is known in the art that this customary mixture of the benzene hexachloride isomers has insecticidal value, but that it is in only one of the isomeric forms of benzene hexachloride, namely the gamma form, that substantially all this insecticidal value resides. Even though benzene hexachloride is greatly diluted when it is compounded into insecticides, the presence of large amounts of insecticidally inactive organic materials such as the alpha and beta isomers is considered undersirable by the compounder of insecticides. Ideally, therefore, a benzene hexachloride product for compounding into insecticides should consist solely or largely of the gamma isomer.

However, it had not been commercially feasible before our work was carried out, so far as we are aware, to produce a useful benzene hexachloride material for insecticidal purposes containing appreciably more than the "natural" proportion of 10 to 12% gamma isomer, since the separation of a gamma-rich solid product from the natural mixture of four isomers has involved the tedious and costly steps of successive resolutions and crystallizations, whereby a gamma-rich product may eventually be obtained as one of the crystallization products.

2

We have now discovered a process for chlorination of benzene and recovery of a new benzene hexachloride product making it possible to obtain a gamma-rich benzene hexachloride product directly from the synthesis reaction mixture. Our process involves the successive steps of (a) chlorinating liquid benzene, to form benzene hexachloride, while substantially maintaining the temperature during chlorination not higher than about 40° C., preferably within the range of about 15–40° C., (b) discontinuing such chlorination when from about 20% to about 50% of the benzene has thus been converted to benzene hexachloride, (c) separating solid phase material from liquid phase material while maintaining the temperature within the range from about 0° C. or slightly below up to about 40° C., the temperature maintained during the separation step preferably being further correlated with the extent of chlorination as more fully described below, and (d) separately recovering without further chlorination benzene hexachloride product of reaction that remains in solution in the unchlorinated liquid benzene. Although it is convenient to use chlorine in gaseous form in our process, other forms, e. g. liquid chlorine may be used.

It may be desirable to correlate the temperature of the separation step with the extent of chlorination so as to employ temperatures in the lower part of the indicated separation temperature range when the extent of chlorination is in the lower part of its range, and to employ temperatures in the upper part of the indicated separation temperature when the extent of chlorination is in the upper part of its range. However, as hereinafter discussed, such correlation is of little importance when the extent of chlorination is about 35% or more.

We have found that by following the steps above above outlined, the benzene hexachloride product obtained in step (d) above exhibits from about 2 times to more than 4 times the insecticidal efficacy of the products which have heretofore been recovered directly from the chlorination reaction mixture. For example, the gamma isomer concentration in the product prepared according to our invention may range from about 25% to 40 or 50%, whereas the gamma isomer concentration in products prepared by comparable prior art processes is usually in the range of 10–12%. We have further found that our gamma isomer rich benzene hexachloride product is substantially free from higher chlorinated products, such as the heptachloro derivative of benzene, which might have a deleterious effect on the compounding of our product for the various applications for which it is intended.

In a preferred method of carrying out the process of our invention, gaseous chlorine is led into liquid benzene, e. g. commercially available benzene. No solvent other than benzene is present in any substantial amount. The chlorination is carried out in the presence of actinic irradiation, e. g. the irradiation emitted by an ultra-violet lamp, bright sunlight, or other source of actinic light. The introduction of chlorine is preferably carried out with cooling if necessary to maintain the mixture below about 40° C. Chlorination is discontinued when from about 20% to about 50% of the benzene has been chlorinated, or, as disclosed in co-pending application Serial No. 695,277 of which the present application is a continuation-in-part, chlorination may be discontinued when from about 25% to about 50% of the benzene has been chlorinated, or the chlorination step may involve chlorinating not more than about 40% of the benzene.

Agitation of the reaction mixture is preferably maintained during chlorination and, after chlorination has been discontinued, the mixture is preferably further agitated and treated to eliminate unreacted chlorine. The chlorine-free reaction mixture is then cooled and maintained at a temperature correlated with the extent of chlorination, as above described, while the solid phase which is formed is separated, e. g. by filtration. The separated solid represents the part of the benzene hexachloride product of chlorination that is richer in alpha and beta isomers than the whole product normally formed upon chlorination. Under the conditions described, from about 60 to 75% of the whole benzene hexachloride reaction product may thus precipitate as alpha and beta concentrate.

The solution remaining after removal of the solid alpha and beta isomers contains dissolved therein substantially all of the gamma isomer formed during chlorination. This solution is now treated to recover this product, which may advantageously be done merely by evaporating the unreacted benzene.

The gamma-rich product thus recovered will eventually set to solid form. This may be expedited by chilling, preferably at a temperature of 0°–5° C. Any residual benzene or volatile by-products may be removed from the solid (hereinafter called "solid gamma concentrate") by air drying.

The solid gamma concentrate thus obtained is a new composition of important insecticidal value. This product is a mixture of two or more benzene hexachloride isomers and contains in addition some by-products of the benzene chlorination process in small amount. This new product may contain from about 25 to about 50% of the gamma isomer of benzene hexachloride and contains at least 80%, preferably at least 85%, of all the isomers of benzene hexachloride. The product gradually becomes liquid through a temperature range which is within the limits of about 40° to 75° C. This product may be compounded into dusts, sprays, emulsions and other insecticidal compositions in the usual manner.

The following examples are illustrative of the process of our invention:

Example 1

A glass lined water cooled reactor equipped with mercury vapor light and agitator was charged with 140 parts by weight of benzene. 160 parts by weight of chlorine was then added at a rate of approximately 16 parts per hour. When all the chlorine had been added the batch was agitated with the light on for two hours to use up any free chlorine.

The batch was then cooled down to room temperature (about 25° C.) and filtered through a ceramic filter using a glass cloth filter medium. The filter cake was then washed with a small amount of benzene. Approximately 175 parts by weight of filter cake and 145 parts by weight of filtrate were obtained. The filter cake was chiefly the alpha and beta isomers of benzene hexachloride and the filtrate was a solution of the gamma concentrate.

The filtrate was run into a glass lined still and the benzene was distilled off in about 1 to 1½ hours' time. From 50 to 60 pounds of gamma concentrate product was thus obtained.

In the above run the extent of chlorination was from about 43 to 45% and the temperature during the separation step was accordingly within 10 degrees of the 23 to 25° C., temperature called for by the above described correlation.

Example 2

When the above run is modified so as to chlorinate the benzene to the extent of only 20% instead of 43 to 45% the subsequent separation may advantageously be carried out at about 0° C. With such a procedure about 60% of the total benzene hexachloride formed is separated as alpha beta filter cake, instead of about 75% as in Example 1. When the filtrate is then worked up as described in Example 1 a high quality gamma concentrate is obtained.

Example 3

Similarly should the process of Example 1 be followed and the extent of chlorination carried to 30% of the benzene employed the subsequent separation step may be carried out at about 15° C. and about 63% of the benzene hexachloride formed may be separated as solid alpha beta isomer cake. The filtrate from this separation may then be worked up as described in Example 1 to produce a good quality solid gamma concentrate.

We have further found that when the extent of chlorination comes within the relatively narrow range of 35% to 50% of the benzene employed the temperature during the subsequent separation step may be maintained anywhere within the range from about 0° C. to about 40° C. and the product eventually recovered from the filtrate will still be a reasonably high quality solid gamma concentrate. That is, the correlation between separation temperature and extent of chlorination, above described, is more important for the lower portion of the range of chlorination extent specified. An advantageous commercial process involves chlorination of about 40 to 50% of the benzene and maintenance of the temperature anywhere within the range of about 15 to 30° C. during the subsequent separation step.

The percent gamma isomer in each of the above described products was gauged by the percent insecticidal effectiveness of the products, as compared to pure gamma isomer. This was determined by parallel tests of the product, and pure gamma isomer, to obtain the relative percent kill of the common house fly under the following test conditions:

The material to be tested was dissolved in an appropriate quantity of acetone so that application of a regulated quantity to glass plates, on evaporation of the acetone, left a residue of the material equivalent to 10 mg./ft.$^2$. The treated plates were placed in screen cages stocked with flies and observation made every half hour until total mortality was achieved. Each test was carried out at least in duplicate, and checks were supplied by simultaneously testing with untreated plates.

Percent insecticidal effectiveness was obtained by dividing the time required to obtain 100% mortality with the products of our invention into the time required to obtain 100% mortality with the pure gamma isomer, the tests being performed under equivalent conditions.

Since many modifications are possible in the process of our invention as above described without departure from the scope of the invention, it is intended that the above description of our invention should be interpreted as illustrative, and the invention is not to be limited except as set forth in the claims which follow.

We claim:

1. The method for production of a benzene hexachloride product rich in gamma isomer that comprises reacting liquid benzene with chlorine at a temperature not higher than about 40° C., with actinic light irradiation of wave length within the range including visible and ultra violet radiation, to form benzene hexachloride, discontinuing such chlorination after about 20 to about 50% of the benzene has been thus converted to benzene hexachloride, removing solid phase material from the resulting mixture while maintaining the temperature in the range from about 0° C. to about 40° C. and separately recovering, without further chlorination, solid benzene hexachloride product of reaction that remains in solution in the unchlorinated benzene.

2. The method for production of a benzene hexachloride product rich in gamma isomer that comprises reacting liquid benzene with chlorine with actinic light irradiation, and at a temperature which is substantially maintained below about 40° C., to form benzene hexachloride, discontinuing such chlorination when from about 25% to about 50% of the benzene has been thus converted to benzene hexachloride, removing solid phase material from the resulting mixture at a temperature within the range of about 20° to about 40° C., and evaporating benzene from the liquid phase material thus separated to recover separately, without further chlorination, as a solid product rich in gamma isomer, benzene hexachloride product of reaction that remains in solution in the unchlorinated benzene.

3. A method for production of a benzene hexachloride product rich in gamma isomer that comprises reacting chlorine with liquid benzene substantially free from solvent, with actinic light irradiation of wave length within the range including visible and ultra violet radiation and agitation and at a temperature within the range of about 15 to about 40° C., to form benzene hexachloride, discontinuing such chlorination after about 20% to about 50% of the benzene has been thus converted to benzene hexachloride, separating solid phase material from liquid phase material while maintaining the temperature in the range from about 0° C. up to about 40° C. said temperature of separation further being correlated with the extent of chlorination so as to employ temperatures in the lower part of the temperature range indicated when the extent of chlorination is in the lower part of the range given for extent of chlorination and to employ temperatures in the upper part of the temperature range indicated when the extent of chlorination is in the upper part of the range given for extent of chlorination, and separately recovering, without further chlorination, solid benzene hexachloride product of reaction that remains in solution in the unchlorinated benzene.

4. The method for production of a benzene hexachloride product rich in gamma isomer that comprises reacting liquid benzene with chlorine at a temperature not higher than about 40° C., with actinic light irradiation of wave length within the range including visible and ultraviolet radiation, to form benzene hexachloride, discontinuing such chlorination when from about 30% to about 50% of the benzene has been thus converted to benzene hexachloride, removing solid phase material from the resulting mixture while maintaining the temperature in the range from about 15° C. to about 40° C., and separately recovering, without further chlorination, solid benzene hexachloride product of reaction that remains in solution in the unchlorinated benzene.

5. The method for production of a benzene hexachloride product rich in gamma isomer that comprises reacting chlorine with liquid benzene substantially free from solvent, with actinic light irradiation of wave length within the range including visible and ultra violet radiation and agitation and at a temperature within the range of about 15 to about 40° C., to form benzene hexachloride, discontinuing such chlorination after about 35% to about 50% of the benzene has been thus converted to benzene hexachloride, separating solid phase material from liquid phase material while maintaining the temperature in the range from about 0° C. to about 40° C., and separately recovering, without further chlorination, solid benzene hexachloride product of the reaction that remains in solution in the unchlorinated benzene.

6. The method for production of a benzene hexachloride product rich in gamma isomer that comprises reacting liquid benzene with chlorine at a temperature within a range of about 15° C. to about 40° C., with actinic light irradiation of wave length within the range including visible and ultraviolet radiation, to form benzene hexachloride, discontinuing such chlorination when from about 20% to about 45% of the benzene has been thus converted to benzene hexachloride, removing solid phase material from the resulting mixture while maintaining the temperature in the range from about 0 to about 40° C., and separately recovering, without further chlorination, solid benzene hexachloride product of reaction that remains in solution in the unchlorinated benzene.

7. The method for production of a benzene hexachloride product rich in gamma isomer that comprises reacting liquid benzene with chlorine at a temperature within a range of about 15° C. to about 40° C., with actinic light irradiation of wave length within the range including visible and ultraviolet radiation, to form benzene hexachloride, discontinuing such chlorination after about 30 to about 45% of the benzene has been thus converted to benzene hexachloride, removing solid phase material from the resulting mixture while maintaining the temperature in the range from about 15° C. to about 40° C., and separately recovering, without further chlorination, solid benzene hexachloride product of reaction that remains in solution in the unchlorinated benzene.

WILLIAM A. LA LANDE, Jr.
MARGARETTA ELIZABETH AEUGLE.
GLADYS MOLYNEUX.

REFERENCES CITED

The following references are of record in the file of this patent:

UNITED STATES PATENTS

| Number | Name | Date |
|---|---|---|
| 2,218,148 | Hardie | Oct. 15, 1940 |
| 2,438,900 | Cooke et al. | Apr. 6, 1948 |
| 2,529,803 | Gonze | Nov. 14, 1950 |

FOREIGN PATENTS

| Number | Country | Date |
|---|---|---|
| 504,569 | Great Britain | Apr. 26, 1939 |
| 573,689 | Great Britain | Dec. 3, 1945 |
| 586,442 | Great Britain | Mar. 19, 1947 |
| 460,288 | Belgium | Oct. 31, 1945 |

OTHER REFERENCES

Slade, Chemistry and Industry, Oct. 13, 1945, pp. 314–319.